United States Patent [19]

Sahara et al.

[11] 4,091,396
[45] May 23, 1978

[54] CAMERA EXPOSURE CONTROL AND INDICATING CIRCUITRY RESPONSIVE TO A SIGNAL FROM A FLASH DEVICE

[75] Inventors: Masayoshi Sahara, Sennan; Motonobu Matsuda, Kawachinagano; Yoshiharu Ohta, Izumi, all of Japan

[73] Assignee: Minolta Camera Kabushiki Kaisha, Osaka, Japan

[21] Appl. No.: 818,963

[22] Filed: Jul. 25, 1977

[30] Foreign Application Priority Data

Jul. 30, 1976 Japan .................................. 51-91700

[51] Int. Cl.² .......................... G03B 15/05; G03B 7/08
[52] U.S. Cl. .................................. 354/23 D; 354/53; 354/60 A; 354/60 F; 354/60 L; 354/149
[58] Field of Search .............. 354/23 D, 32, 33, 34, 354/50, 51, 53, 60 A, 60 F, 60 L, 139, 145, 149

[56] References Cited
U.S. PATENT DOCUMENTS

| 4,016,575 | 4/1977 | Uchiyama et al. | 354/139 X |
| 4,043,677 | 8/1977 | Toyoda | 354/53 X |
| 4,047,194 | 9/1977 | Nakamura et al. | 354/149 |

Primary Examiner—L. T. Hix
Assistant Examiner—M. L. Gellner
Attorney, Agent, or Firm—Watson, Cole, Grindle & Watson

[57] ABSTRACT

Camera exposure control circuitry for automatically controlling exposure time or the diaphragm aperture in accordance with scene brightness, is provided with an indicating device for indicating exposure conditions to be determined by the control circuitry. In response to a rectangular wave signal produced by a photoflash device upon completion of charging of the main capacitor thereof, the control circuitry is set to provide a proper exposure condition suitable for flash photography. The indicating device intermittently energizes one of a plurality of indicator elements that indicates the proper exposure condition, in response to upper level portions of the rectangular wave signal. An exposure control magnet is controlled by two parallelly connected transistors, one being responsive to the output of the control circuitry and the other being responsive to the signal from the photoflash device.

19 Claims, 4 Drawing Figures

CAMERA EXPOSURE CONTROL AND INDICATING CIRCUITRY RESPONSIVE TO A SIGNAL FROM A FLASH DEVICE

BACKGROUND OF THE INVENTION

This invention relates to camera exposure control circuitry, and more particularly to exposure control circuitry operative in response to a signal from an electronic flash device during flash photography operation.

In the case of flash photography with an electronic flash device, unless the main capacitor charge in the electronic flash device exceeds a given level, photography with appropriate exposure cannot be effected. It is therefore advantageous if the charged condition of the main capacitor is detected and a light emitting element in the camera viewfinder is flashed to notify the photographer of whether or not a desired photographic exposure is possible. Further, the exposure time for flash photography should be controlled at a given shutter speed (for instance 1/60 second) in synchronization with the firing of the electronic flash tube, especially where the shutter is a focal plane shutter. Accordingly, if the setting of the aforesaid shutter speed is automatically effected in response to the detection of the completion of the main capacitor charging, then there may be obtained many advantages in the practical application of a camera.

SUMMARY OF THE INVENTION

It is accordingly an object of the present invention to provide a control circuit that is simply constructed and capable of performing the aforesaid operation in response to a signal from an electronic flash device, which signal is provided upon completion of the main capacitor charging.

It is another object of the present invention to provide such a circuit that is suitable for integrated circuitry.

In accordance with the control circuit of the present invention, when a signal as shown in FIG. 3 is generated in accordance with the charged condition of the main capacitor in an electronic flash device, and the exposure time is controlled in an electronic-flash-photography-synchronizable shutter speed mode, the flashing of a light emitting indicator means is observed through the camera viewfinder. The above operation may be attained by a single control circuit, in place of first and second control of circuits of the present invention adapted to operate at different reference voltage levels, in a manner that a light emitting indicator means in a viewfinder is flashed depending on the operating or non-operating condition of the control circuit. A signal fed into the control circuit may also be introduced in a rectifying circuit including a capacitor, and converted into a steady signal, so that the exposure time may be controlled by the steady signal to provide electronic-flash-photography-synchronizable shutter speed control. However, the rectifying circuit of the above imaginary circuit cannot be designed as an integrated circuit, thus presenting disadvantages in the design of a camera. But according to the present invention the desired portion of the control circuit can be formed as an integrated circuit, without increasing the manufacturing cost and size of the camera.

Additionally, operation of a first control circuit is maintained steady, as long as a signal from an electronic flash device is being fed to the circuit, so that the required indication of exposure information for ordinary photography, which is not required for flash photography, may be controlled for a different condition (i.e., non-operating condition) than that the ordinary photography within the viewfinder. This enables further positive indication in the viewfinder.

DESCRIPTION OF THE PREFERRED EMBODIMENTS

Figure 1:
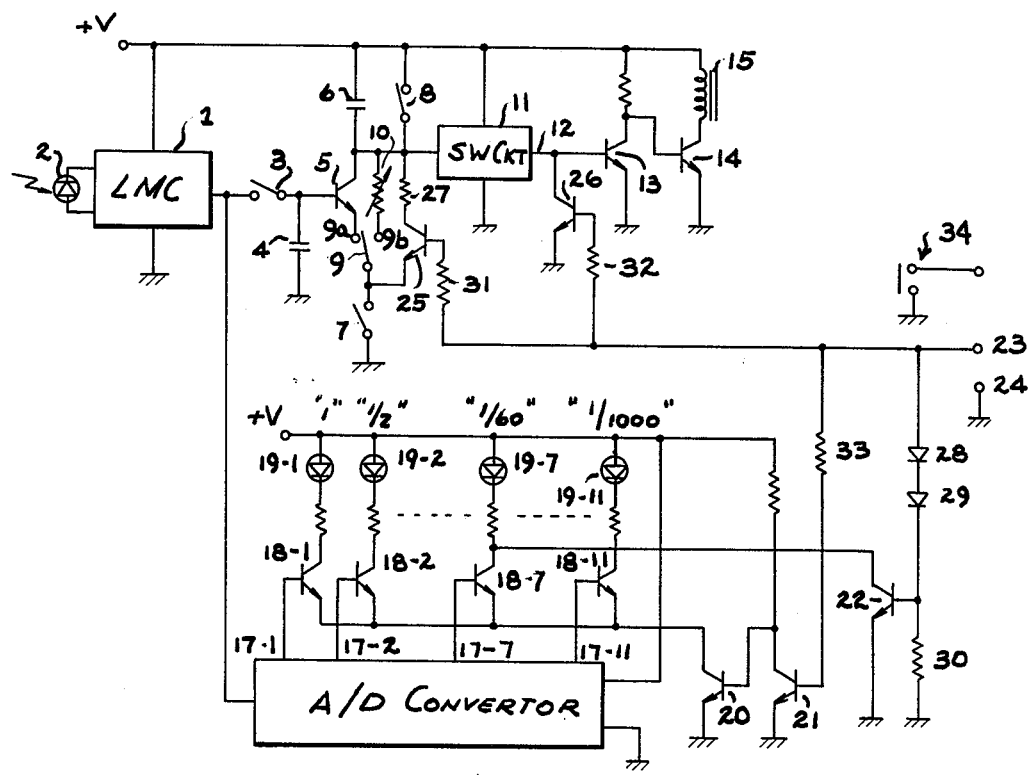
FIG. 1 is a circuit diagram of a camera exposure control circuit including the circuit embodying the present invention.

Referring to Figure 1, light measuring circuit 1 includes photoelectric element 2 adapted to receive object light through the camera objective lens (not shown). Additionally, film sensitivity setting and the preset-diaphragm-aperture-value, in the case of diaphragm-fully-open light measurement, are input to light measuring circuit 1 in a manner well known to those skilled in the art. The aforesaid data and object-light information are computed in accordance with the APEX Notation System, so that an exposure time control signal is obtained. Storing switch 3 is adapted to be opened in response to shutter releasing operation, whereby an output signal from light measuring circuit 1, which is commensurate with the object brightness resulting immediately before the mirror is released, is retained by capacitor 4. Logarithmic expansion transistor 5 provides a current corresponding to the antilogarithm of the voltage stored by capacitor 4. Capacitor 6 is charged by and integrates the collector current from transistor 5. Switch 7 is adapted to be closed in response to a shutter-opening operation to commence the integrating operation of capacitor 6. Switch 8 allows capacitor 6 to be maintained discharged, and is adapted to be opened before, or simultaneously with, the closing of switch 7. Switch 9 is an auto-manual control mode switch for the exposure time. Switch contact 9a provides automatic exposure control, and switch contact 9b affords manual exposure control. The resistance of variable resistor 10 depends on the manual shutter speed setting, and resistor 10 constitutes a time constant circuit with capacitor 6, when switch 9 remains closed on contact 9b. Switching circuit 11 provides an inverted output 12, when the charge voltage of capacitor 6 reaches a given voltage level. Transistor 13 is then turned on by switching circuit 11, and transistor 14 is thereby turned off, so that electromagnet 15 is deenergized to close the shutter. The aforesaid circuitry and operation are known.

Figure 2:
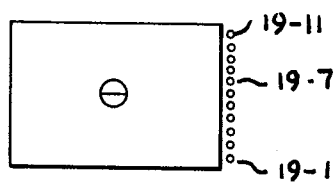
FIG. 2 is a view illustrative of a field-of-view in a viewfinder in a camera.

Analog-to-digital (A/D) converting circuit 16 converts the analog voltage signal from light measuring circuit 1 into a digital output to energize an indicating element corresponding to that shutter speed to be indicated, among indicating elements 19, such as for example light emitting diodes, which are arranged in a line within the viewfinder field of view, as shown in FIG. 2. Transistors 18-1 to 18-11, the respective bases of which are respectively connected to output terminals 17-1 to 17-11 of A/D converting circuit 16, are output transistors adapted to control the energization of light-emitting diodes 19-1 to 19-11 connected to the collectors thereof. The emitters of transistors 18-1 to 18-11 are connected in common, and grounded by transistor 20. The base potential of transistor 20 is controlled by transistor 21. The collector of transistor 18-7, which controls light emitting diode 19-7 for indicating a shutter speed of 1/60 second, is grounded by transistor 22.

Terminals 23, 24 are connected to receive signals from an electronic flash device, as is described hereinafter. The respective bases of transistors 21, 22, 25 and 26 are connected to terminal 23, and are switched by a signal from the electronic flash device. The collector of transistor 25 is connected by resistor 27 to the collector of transistor 5, and the emitter of transistor 25 is connected by switch 9 to either the emitter of transistor 5 or to the collector thereof through variable resistor 10. The collector of transistor 26 is connected to output 12 of switching circuit 11, and the emitter of transistor 26 is grounded. The base of transistor 22 is connected to a voltage dividing node between the series circuit connection of diodes 28, 29 and resistor 30. With the aforesaid circuit arrangement, transistors 21, 22, 25, 26, resistors 30, 31, 32, 33 and diodes 28, 29, may be formed into a semi-conductor integrated circuit. 34 is a synchroterminal, and the ground terminal thereof is used in common with ground terminal 24.

Figure 3:
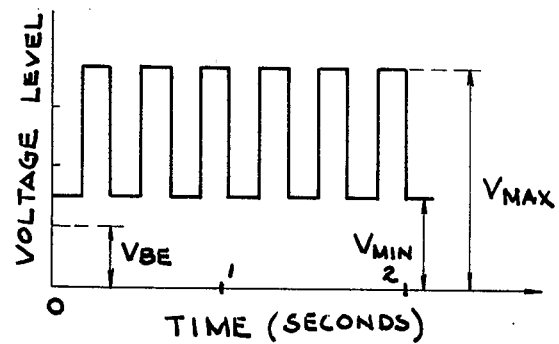
FIG. 3 is a voltage vs time plot of a signal from an electronic flash device.

In the following description of the operation of the aforesaid circuit, it is assumed that a voltage signal from the electronic flash device as shown in FIG. 3 is provided across terminals 23, 24. That voltage signal, as shown in FIG. 3, has a rectangular waveform and a minimum voltage level Vmin. The level of the voltage Vmin of this signal is set midway between the base-to-emitter voltage $V_{BE}$ produced when transistors, such as transistors 21, 25 and 26 are conductive, and a voltage $2V_{BE}$. The maximum level Vmax of that signal is set slightly higher than $2V_{BE}$. The aforementioned signal voltage is produced when the main capacitor in the electronic flash device is charged to a given voltage level.

When the aforesaid signal appears at terminals 23, 24, then transistors 21, 25, 26 are made conductive even by signal level Vmin. Transistor 22 is not made conductive by signal level Vmin due to the voltage drop across diodes 28, 29, but becomes conductive according to signal level Vmax. When a signal is fed to terminals 23, 24, the indicating circuit then operates as follows. Transistor 21 is turned on, and transistor 20 is turned off, so that no current flows through transistors 18-1 to 18-11, except 18-7, and as a result, indication of the shutter speed can no longer be given in response to the output of light measuring circuit 1. However, transistor 22 cycles ON-OFF according to the pulse component of the signal from the electronic flash device, so that light emitting diode 19-7 is flashed. Light emitting diode 19-7 indicates 1/60 second, which is a synchronizing speed for the electronic flash device, and flashes to indicate that the main capacitor in the electronic flash device has been charged. Hence, frequency of the voltage signal of rectangular waveform should be of the value to provide recognizable flashing of the light emitting element 19-7. In a preferred embodiment, the frequency is 3 Hz.

The following is a description of the exposure time control taken in conjunction with the control signals from the flash device, the structure and operation of which are described hereinafter. When the signal is applied, transistor 26 is turned on, so that transistor 13 is turned off, and as a result transistor 14 is turned on and electromagnet 15 remains excited. At this time, when the shutter is released and switch 7 is closed, capacitor 6 is charged by the collector current from transistor 5 as well as with the current flowing through transistor 25 and resistor 27. In this case, the current flowing through transistor 25 is relatively increased, for instance to a value such that the output of ON-OFF condition switching circuit 11 is inverted within a short period of time, for example about 1/500 second, that is well shorter than the flash synchronizable shutter speed. Accordingly, the output of ON-OFF condition switching circuit 11 is inverted within 1/500 second, regardless of the magnitude of the collector current of transistor 5. When the shutter is released and opened, the camera X contact is closed, and the electronic flash tube is fired, causing a rapid discharge of the main capacitor, so that the signal fed through terminals 23, 24 disappears, and transistor 26 is turned off. Because the output of switching circuit 11 has been inverted at this time, transistor 13 is made conductive thereby. Accordingly, when the signal from the electronic flash device is not present, and transistor 26 is turned off, then transistor 13 is immediately turned on, and electromagnet 15 is deenergized to close the shutter. In this manner, in the electronic flash photography mode of operation, the shutter is controlled to be closed after the electronic flash tube has been fired, i.e., immediately after the X contact has been closed.

The circuitry shown in FIG. 1 is of the type, in which the automatically controlled exposure time is indicated. However, this should not be construed in a limited sense, for instance, the indicating device according to the present invention may be applied to a camera of the type, in which the diaphragm is automatically set commensurate with an exposure time that has been manually set, and then the diaphragm aperture value may be indicated. Moreover, the present invention is applicable to a camera of the type, in which exposure information may be indicated by using an indicating device incorporating numerical indicating means including, for example, seven segments. In this case, in the electric flash photography mode, the electronic-flash-synchronizable-shutter speed, i.e., the numeral "60" representing 1/60 second is flashed. Alternatively, the indicating means which is flashed upon completion of charging of the electronic flash device may be provided within a viewfinder, separately from the ordinary exposure information indicating means.

Figure 4:
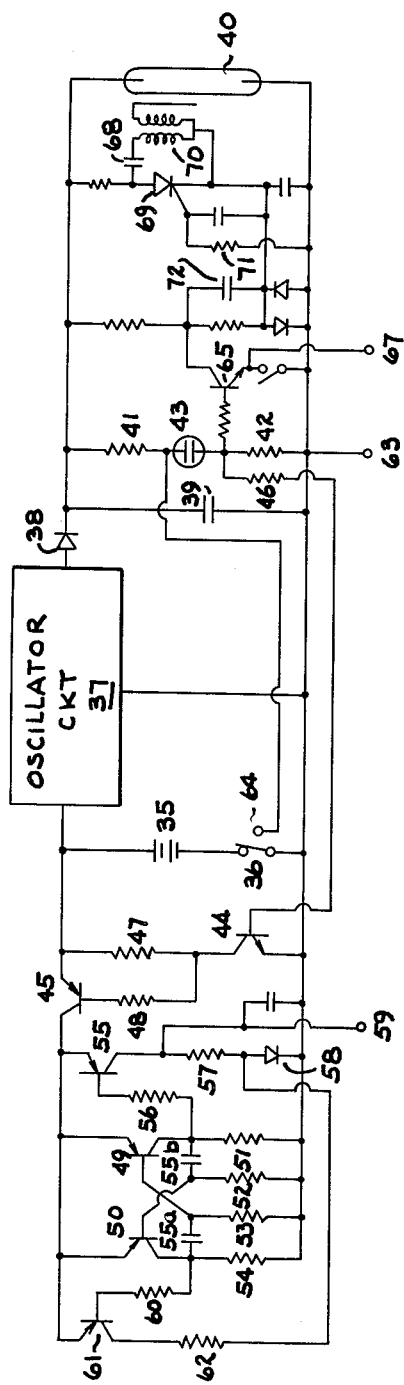
FIG. 4 is a circuit diagram of an electronic-flash light emitting device for generating the signal shown in FIG. 3.

FIG. 4 shows an electronic flash device circuit generating the signal as shown in FIG. 3, upon the completion of charging of the main capacitor therein. 35 is a power source battery, and 36 is a power source switch. In the condition shown, power source switch 36 is turned on. Oscillating circuit 37 is a known DC-DC converter, including a booster transformer. Rectifying diode 38 rectifies the output of oscillating circuit 37. Flash energy is stored in main capacitor 39, and capacitor 39 is discharged through flash tube 40 by means of a trigger circuit, whereupon the flash tube is fired. Neon tube 43, connected between resistors 41 and 42, flashes when main capacitor 39 is charged to a given voltage level, thereby indicating a charged condition of the main capacitor. The aforesaid arrangement of the electronic flash device is well known.

The circuit consisting of transistor 44 and resistors 46, 47, 48 is a switching circuit which detects when main capacitor 39 is charged to a given voltage level, and neon tube 43 flashes, thereby making transistor 45 conductive. The circuit consisting of transistors 49, 50, resistors 51, 52, 53, 54, and capacitors 55a, 55b is a known astable multivibrator, and assumes a power-source-supply condition and oscillates, when transistor 45 becomes conductive. Transistor 55, the base of which is connected through resistor 56 to the collector of transistor 49, is made conductive, when transistor 49 remains in a shut-off condition, thereby supplying a current to resistor 57 and diode 58 connected to the collector thereof. At this time, a voltage level Vmax, as shown in FIG. 3, appears at terminal 59. Transistor 61, the base of which is connected through resistor 60 to the collector of transistor 50, becomes conductive when transistor 50 remains in a shut-off condition (transistor 49 is conductive), thereby supplying current to diode 58 through resistor 62 connected to the collector of transistor 61. At this time, the voltage produced across the terminals of diode 58 appears at terminal 59, and provides voltage level Vmin. The voltage levels Vmax, and Vmin are set by resistor 57 and diode 58 and the current flowing therethrough. Also, if a light emitting diode is used as diode 58, then the charged condition of main capacitor 39 may be indicated in the same manner as that of discharge tube 43. 63 is a grounding terminal.

The following is a description of the operation of the circuit of FIG. 4. Terminals 59, 63 are respectively connected to terminals 23, 24 in the circuit of FIG. 1. When power source switch 36 is closed, in the case where main capacitor 39 is charged to a given voltage level, then discharge tube 43 flashes, and a voltage is produced across the terminals of resistor 42, so that transistor 44 becomes conductive, whereupon transistor 45 becomes conductive, thereby supplying a current from power source 35 to the collector load. Due to the supply of current from power source 35, the non-stable multivibrator, including transistors 49, 50, oscillates, thereby making transistors 55 and 61 alternately conductive cyclically. Thus, voltage levels Vmax and Vmin appear at terminal 59. When flash tube 40 is energized and the voltage at main capacitor 39 drops, then discharge tube 43 is turned off, transistor 44 is turned off, and the multivibrator does not operate so that the signal across terminals 59 and 63 disappears.

Meanwhile, the circuit which produces an output waveform as shown in FIG. 3 may be the circuit of FIG. 4, which includes a non-stable multivibrator, or a relaxation oscillating circuit including a uni-junction transistor, or any other suitable type of oscillating circuit.

In the case where ordinary photography is effected, with a flash device mounted on the camera, when power source switch 36 in the flash device is opened, then the signal shown in FIG. 3 disappears, so that the camera assumes an ordinary photographic mode. However, where main capacitor 39 is maintained in a charged condition, even after power source switch 36 has been opened, flash tube 40 would be triggered due to the closing of the camera X contact. Switch contact 64 is provided to prevent the aforesaid unwanted triggering of flash tube 40, and the operation of switch contact 64 is described hereinafter with reference to the triggering circuitry for flash tube 40.

Terminal 67 is connectable to terminal 34 (FIG. 1) on the side of the camera. Charged triggering capacitor 68 is quickly discharged through coil 70, when SCR 69 becomes conductive, thereby triggering flash tube 40.

The gate of SCR 69 is connected through resistor 71 and switch 36 to the negative terminal of power source battery 36, and the cathode of SCR 69 is connected to the negative terminal of charged capacitor 72. Accordingly, SCR 69 is normally maintained in a non-conductive condition. The positive terminal of capacitor 72 is connected through the collector-emitter of transistor 65 to terminal 67. Since the base of transistor 65 is connected to the junction between discharge tube 43 and resistor 42, the potential at the base of transistor 65 is maintained high, when discharge tube 43 is lit. Accordingly, when the camera X contact is closed, in the flash photography mode, terminals 63, 67 are closed, so that transistor 65 becomes conductive, thereby maintaining the potential at the positive terminal of capacitor 72 substantially equal to the potential at the negative terminal of power source battery 35. The potential of the cathode of SCR 69, connected to the negative terminal of capacitor 72, becomes lower than the potential at the gate thereof, so that SCR 69 becomes conductive.

The following is a description of the circuit operation of FIG. 4 with the power source switch 36 opened and contacting terminal 64. Thereby, the potential at the positive terminal of discharge tube 43 becomes equal to the potential at the negative terminal of resistor 42, so that discharge tube 43 can no longer be lit, even if main capacitor 39 is maintained in a charged condition. As a result, the base potential of transistor 65 is lowered, so that transistor 65 is not made conductive, even if the X contact is closed, and flash tube 40 can no longer be triggered. Accordingly, power source switch 36 is adapted to be closed on terminal 64, when power source switch 36 is opened (i.e., disconnected from power source 35). Thereby, discharge tube 43 is not lit, even if main capacitor 39 is charged, and consequently flash tube 40 is not triggered.

It is to be noted that the oscillation circuit for producing the rectangular wave signal may be incorporated in the circuitry in the camera body instead of in the flash device circuit as in FIG. 4. In that case, the oscillation circuit generates the rectangular wave signal in response to a signal from the flash device that may be produced upon completion of charging of the main capacitor.

What is claimed is:

1. In a photographic camera, the combination comprising:
   automatic exposure control circuitry;
   indicating means for indicating at least one exposure condition;
   an electronic flash device including a main capacitor and flash means energized thereby, and means for generating a multilevel signal having an amplitude varying between predetermined upper and lower levels with said main capacitor in a charged condition;
   first means responsive to said multilevel signal for setting said exposure control circuit to a proper condition for flash photography; and
   second means responsive to the upper level of said multilevel signal for energizing said indicating means to indicate a photographic condition associated with flash photography.

2. The combination according to claim 1 wherein said indicating means includes a plurality of indicator elements and said second means intermittently energizes one of said indicator elements in response to the upper level of said multilevel signal.

3. The combination according to claim 2 wherein said exposure control circuitry includes a light measuring circuit and said second means includes means for continuously energizing a selected one of said plurality of indicator elements in response to the output of said light measuring circuit in the absence of said multilevel signal from said flash device.

4. The combination according to claim 2 wherein said exposure control circuitry includes a light measuring circuit and said second means includes first control means responsive to the output of said light measuring circuit for generating a plurality of control signals, each control signal corresponding to a given output of said light measuring circuit, and second control means responsive to said multilevel signal for disabling actuation of said plurality of indicator elements with the exception of said one indicator element, and for enabling energization of said plurality of indicator elements in the absence of said multilevel signal, a selected one of said plurality of indicator elements being energized in accordance with one of said plurality of control signals in the absence of said multilevel signal.

5. The combination as in claim 4 wherein said second means includes third control means for intermittently energizing said selected one of said plurality of indicating elements in accordance with the upper level of said multilevel signal.

6. The combination as in claim 5 wherein said first control means is an analog-to-digital converter, said second control means includes first and second transistors, said first transistor being responsive to said multilevel signal to control the non-conduction of said second transistor, said indicator elements each including a control transistor having a first control electrode connected to a respective output of said analog-to-digital converter and a second control electrode connected to said second transistor; and said third control means further including a third transistor connected to a selected one of said light indicator elements for actuating the same, and voltage divider means having a node connected to a control electrode of said third transistor and responsive to said multilevel signal for actuating said third transistor at the upper level of said multilevel signal.

7. The combination as in claim 6 wherein said multilevel signal is a square wave having an upper level Vmax, a lower level Vmin, and $V_{BE} <$ Vmin $<$ Vmax where $V_{BE}$ is the base-to-emitter voltage of said first, second and third transistors.

8. The combination as in claim 7 wherein Vmin is approximately one and one-half times $V_{BE}$ and Vmax is greater than $2V_{BE}$.

9. The combination as in claim 1 wherein said automatic exposure control circuitry includes a light measuring circuit for generating an output in accordance with the light received by a light receptive element, means for integrating the output of said light measuring circuit, first control means responsive to the integrated signal for generating an exposure control signal, and switching means responsive to said control signal for controlling shutter release;
said first means including second control means responsive to said multilevel signal for deactuating said switching means and third control means for actuating said first control means to generate an exposure control signal, said switching means being actuated thereby subsequent to energization of said flash means.

10. The combination as in claim 9 wherein said second control means includes a transistor connected to said means for integrating to decrease the integration time thereof and cause said first control means to generate said exposure control signal, said electronic flash device including means for deactuating said means for generating said multilevel signal with said main capacitor in a non-charged condition, whereby said shutter is released subsequent to energization of said flash means by the deactuation of said second control means with the absence of said multilevel signal.

11. The combination as in claim 10 wherein said multilevel signal is a square wave having an upper level Vmax, a lower level Vmin, and $V_{BE} <$ Vmin $<$ Vmax, where $V_{BE}$ is the base-to-emitter voltage of said transistor.

12. The combination as in claim 11 wherein Vmin is approximately 1½ times $V_{BE}$ and Vmax is greater than $2V_{BE}$.

13. The combination as in claim 12 wherein said integrating means is a capacitor and said second control means causes an increase in the integrating current of said capacitor.

14. The combination as in claim 1 wherein said electronic flash device includes means for deactuating said means for generating said multilevel signal with said main capacitor in a non-charged condition.

15. The combination as in claim 14 wherein said flash device includes means for generating a signal indicating the charged condition of said main capacitor, and detector means responsive to said signal for actuating said means for generating said multilevel signal.

16. The combination as in claim 15 wherein said means for generating said multilevel signal includes a two output astable oscillator and first and second output circuits respectively responsive to each of the two outputs of said astable oscillator, and output means responsive to said first and second output circuits for generating said multilevel signal.

17. The combination as in claim 16 wherein said flash device further comprises a power supply and power supply connecting means responsive to said detector means for connecting said power supply to said astable oscillator, said first and second output circuits and said output means.

18. The combination as in claim 1 wherein said flash device further includes means for generating a signal in response to the charged condition of said main capacitor, triggering means responsive to said signal for energizing said flash means, and means for deactuating said triggering means with said main capacitor in a charged condition during non-flash camera mode operation.

19. The combination as in claim 18 wherein said flash device further includes a power supply and a power switch including first and second contact positions, said flash device being actuated with said power switch in said first position and for deactuating said flash device and said triggering means with said power switch means in said second position, thereby preventing actuation of said flash means with said main capacitor in a charged condition in a non-flash camera mode of operation.

* * * * *